United States Patent Office 3,037,426
Patented June 5, 1962

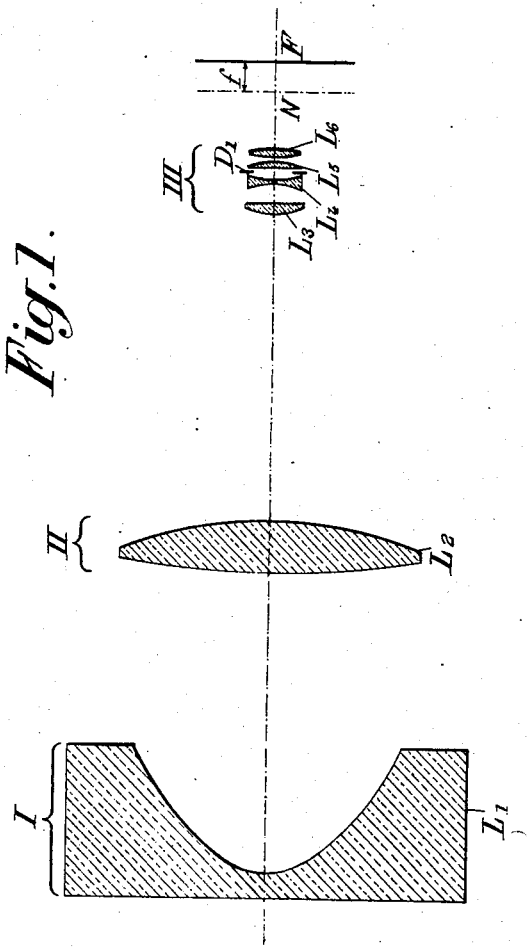

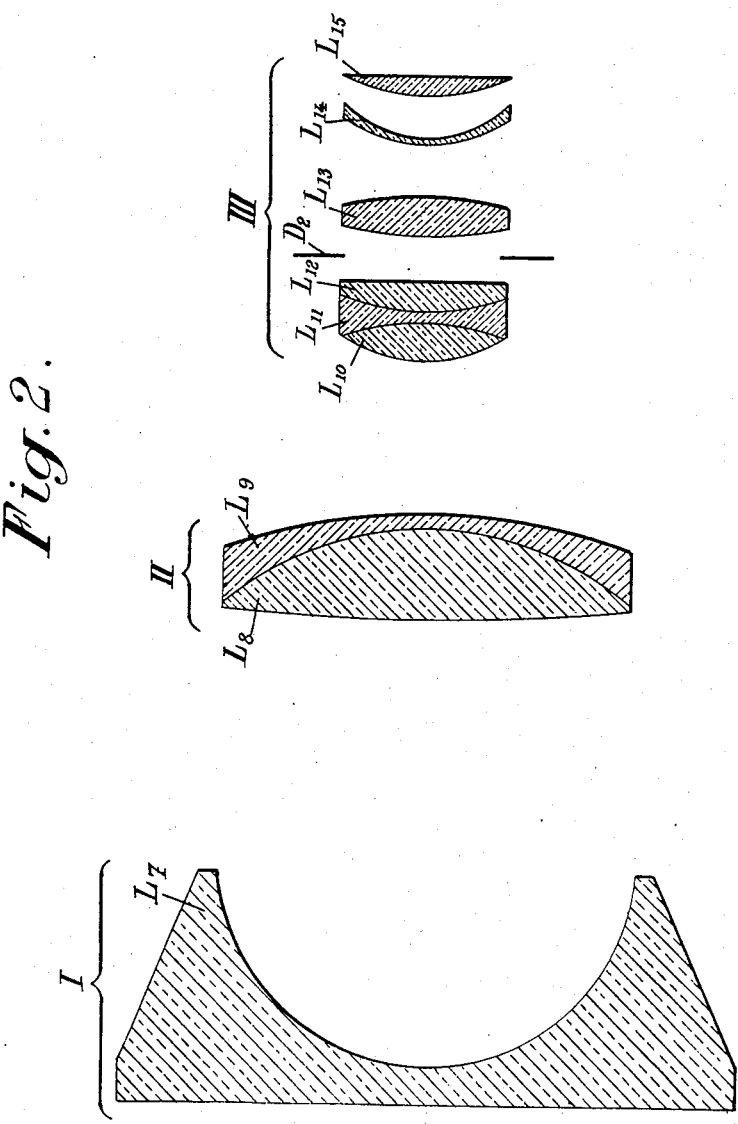

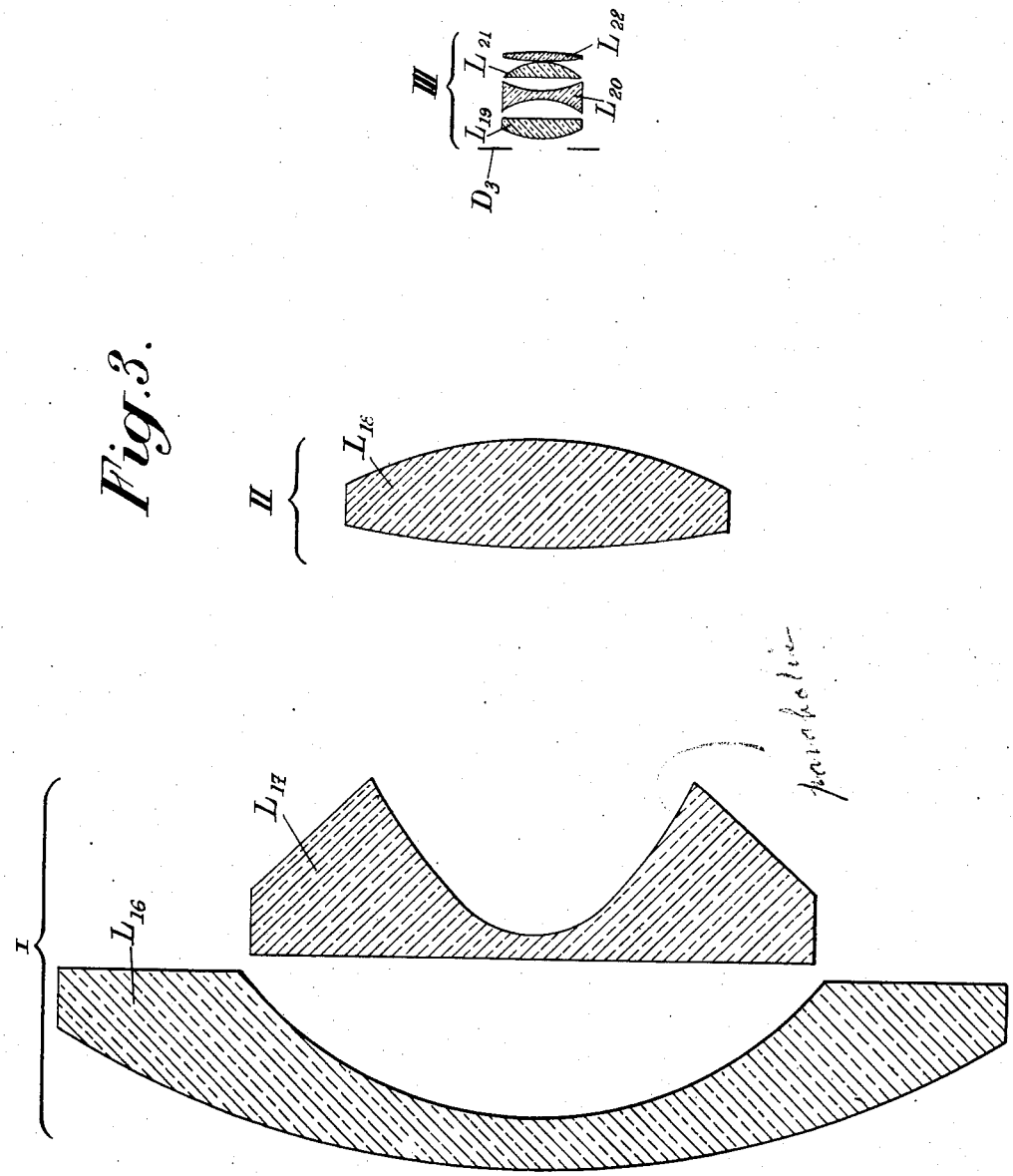

3,037,426
PHOTOGRAPHIC OBJECTIVES HAVING A LARGE ANGULAR FIELD
Edgard Hugues, Courbevoie, France, assignor to Les Appareils de Precision "Kinoptik," Paris, France, a society of France
Filed Aug. 2, 1960, Ser. No. 46,918
Claims priority, application France Sept. 27, 1957
4 Claims. (Cl. 88—57)

The present invention relates to photographic objectives having a large angular field and it is more especially but not exclusively concerned with objectives of this kind for use in connection with moving picture cameras or projectors and television cameras.

The term "dioptric system" is used to designate an optical system consisting either of one lens or of several lenses which may be either separate or juxtaposed to one another.

In the following specification and claims, the direction in which the light is supposed to travel is that corresponding to the use of the objective for the taking of pictures (and not for the projection thereof).

The term "curvature of a lens" is used to designate the quantity $$\frac{1}{2}\left(\frac{1}{R_1}+\frac{1}{R_2}\right)$$

$R_1$ and $R_2$ being the algebraic values of the radii of curvature of the entrance and exit surfaces of said lens with the usual convention of signs for concave or convex surfaces of lenses.

The object of the present invention is to improve some characteristics of objectives as above mentioned while keeping at an acceptable value the aberrations of said objectives.

The essential feature of the invention consists in constituting the objective by three distinct dioptric systems disposed behind one another, the first of said systems having a negative focal length and one of its surfaces having the shape of a paraboloid the concavity of which is turned in the direction in which light is travelling, the second of said systems having a positive focal length.

Advantageously, the focal length $f_2$ of the second dioptric system has a value ranging from two to six times the absolute value $f_1$ of the focal length of the first system.

Preferred embodiments of the present invention will be hereinafter described with reference to the accompanying drawing given merely by way of example and in which:

FIG. 1 diagrammatically shows, in axial section, a photographic objective made according to a first embodiment of the invention.

FIGS. 2 and 3 are similar views of two other embodiments respectively.

The objective shown by FIG. 1 includes three dioptric systems designated respectively by reference characters I, II and III.

System I, which has a negative focal length and a limit surface in the form of a paraboloid, is constituted by a single lens $L_1$, preferably of planoparabolic shape (although the entrance surface might possibly be curvilinear and in particular convex). The focal length of lens $L_1$ is equal to $-21.69$ mm., its refractive index is very high and its dispersion coefficient low.

The essential function of this system is wholly to correct distortion for an object field of an unusually large value, in particular higher than 100°. A simple relation between the refractive index of this lens and the curvature thereof permits of obtaining the desired correction without influencing the other aberrations. In a general manner, the tendency is to transform a barrel-shaped distortion into a crescent-shaped or a cushion-shaped distortion when the refractive index is decreased and/or when the curvature is increased, and it is easy for someone skilled in the art to find, for a given index and a given curvature, conjugate values which eliminate the distortion.

System II, which has a positive focal length, is constituted by a single lens $L_2$ the curvature of which is preferably calculated to give the field curvature a very low value and the dispersive power of which is such that the chromatic aberration relative to the magnitude of the image is approximately corrected. Its focal length is equal to 84.2 mm. and the whole of systems I and II behaves as an afocal telescope of a magnitude equal to 1/3.92 and the exit pupil of which is located at a distance of 71 mm. to the rear of lens $L_2$.

System III is constituted by four lenses $L_3$, $L_4$, $L_5$ and $L_6$ which are respectively a biconvex lens, a biconcave lens, a convergent meniscus and a biconvex meniscus. The power of this system III its positive. The image of a remote object is formed in its focal plane F. N designates the emergence nodal point. The optical and geometric characteristics of this system are choosen so as to correct the spherical aberration, the coma, the astigmatism and the chromatic aberrations of the whole of systems I and II.

By way of example, the following table (Table 1) gives the numeric characteristics of an objective made according to the above example, having a focal length $f=5.8$ mm., an aperture of $f/1.8$ and a total object field equal to 103°. The distance between the image plane and the limit surface of the objective elements that is closest thereto is 17.95 mm., that is to say 3.1 times the focal length. The respective focal lengths of the three groups I, II and III are $-21.69$, $+84.2$ and $+22.79$.

In this table—

The first column relates to the successive lenses of the objective ($L_1$, $L_2$ . . .), The second column indicates the front face and rear face radii of curvature of the respective lenses ($r_{1f}$ and $r_{1r}$ for lens $L_1$, $r_{2f}$ and $r_{2r}$ for lens $L_2$, and so on), with the exception of course of the lens faces of paraboloidal shape, The third column indicates the thickness of each of the lenses and the distance between its rear face and the front face of the lens located immediately behind it ($e_1$ and $d_1$ for lens $L_1$, $e_2$ and $d_2$ for lens $L_2$ and so on), these magnitudes being measured along the optical axis of the objective, The fourth column indicates, for the respective lenses, the refractive indexes ($n_d$) for the $d$ ray of helium, and The fifth column indicates the dispersive coefficients ($\mu$).

It should be noted that, in this example, all the lenses are separated from one another by a layer of air. All the lengths are given in millimeters. In the following tables, when a radius of curvature is written without a sign + or a sign —, this means that it is positive:

Table 1 (FIG. 1)

| Lenses | Radii of curvature | Thicknesses of lenses and distances between them | $n_d$ | $\mu$ |
|---|---|---|---|---|
| $L_1$ | $r_{1f}=\infty$ | $e_1=5.09$ | 1.69153 | 54 |
|  | parabola of parameter equal to 15 | $d_1=59.09$ | air |  |
| $L_2$ | $r_{2f}=+190$ | $e_2=10$ | 1.68129 | 32 |
|  | $r_{2r}=-81.53$ | $d_2=61.15$ | air |  |
| $L_3$ | $r_{3f}=12.83$ | $e_3=2.03$ | 1.62025 | 60 |
|  | $r_{3r}=-343.7$ | $d_3=3.81$ | air |  |
| $L_4$ | $r_{4f}=-13.4$ | $e_4=0.58$ | 1.7315 | 28 |
|  | $r_{4r}=+19.49$ | $d_4=2.69$ | air |  |
| $L_5$ | $r_{5f}=-85.48$ | $e_5=1.58$ | 1.62025 | 60 |
|  | $r_{5r}=-11$ | $d_5=0.34$ | air |  |
| $L_6$ | $r_{6f}=-44.46$ | $e_6=1.13$ | 1.62025 | 60 |
|  | $r_{6r}=-44.46$ |  |  |  |

The diaphragm $D_1$ is located at a distance of 1.4 mm. behind the rear surface of lens $L_4$ and of 1.29 mm. from the front surface of lens $L_5$.

The objective of FIG. 2 differs chiefly from that of FIG. 1 in that the second system consists of two elementary lenses ($L_8$ and $L_9$) and the third system is quite different.

The numerical data concerning the objective of FIG. 2 are as follows.

Table 2 (FIG. 2)

| Lenses | Radii of curvature | Thicknesses of lenses and distances between them | $n_d$ | $\mu$ |
|---|---|---|---|---|
| $L_7$ | $r_{7f}=\infty$ | $e_7=5.09$ | 1.69153 | 54.0 |
|  | rear face section parabola (parameter=15) | $d_7=59.09$ | air |  |
| $L_8$ | $r_{8f}=190$ | $e_8=12$ | 1.68129 | 32.0 |
|  | $r_{8r}=-42.2$ | $d_8=0$ |  |  |
| $L_9$ | $r_{9f}=-42.2$ | $e_9=2$ | 1.674 | 56 |
|  | $r_{9r}=-83.98$ | $d_9=43.46$ | air |  |
| $L_{10}$ | $r_{10f}=17.98$ | $e_{10}=5.29$ | 1.46350 | 65.4 |
|  | $r_{10r}=-33.05$ | $d_{10}=0$ |  |  |
| $L_{11}$ | $r_{11f}=-33.05$ | $e_{11}=1.32$ | 1.72350 | 37.9 |
|  | $r_{11r}=16.12$ | $d_{11}=0$ |  |  |
| $L_{12}$ | $r_{12f}=16.12$ | $e_{12}=3.97$ | 1.46350 | 65.4 |
|  | $r_{12r}=\infty$ | $d_{12}=5.97$ | air |  |
| $L_{13}$ | $r_{13f}=60.02$ | $e_{13}=5.30$ | 1.51350 | 59.0 |
|  | $r_{13r}=-63.85$ | $d_{13}=6.62$ | air |  |
| $L_{14}$ | $r_{14f}=20.10$ | $e_{14}=0.86$ | 1.762 | 27 |
|  | $r_{14r}=15.21$ | $d_{14}=5.46$ | air |  |
| $L_{15}$ | $r_{15f}=23.96$ | $e_{15}=2.68$ | 1.51350 | 59.0 |
|  | $r_{15r}=-176.94$ |  |  |  |

The focal length of the first system (lens $L_7$) is —22.109. The focal length of the second system (lenses $L_8$ and $L_9$) is 87.87. The focal length of the third system (lenses $L_{10}$, $L_{11}$, $L_{12}$, $L_{13}$, $L_{14}$ and $L_{15}$) is 38.64. The focal length of the whole objective is 9.759. The distance between the image plane and the surface of the objective that is closest thereto is 21.841. The aperture is $f/2$ and the total object field is 110°.

The diaphragm $D_2$ is located at a distance of 3 mm. behind the rear face of lens $L_{12}$.

The objective of FIG. 3 differs chiefly from the two examples above described in that the first system consists of two divergent lenses, the first one $L_{16}$ being a spherical meniscus and the second one $L_{17}$ a lens similar to the lens $L_7$ of FIG. 2.

The numerical data concerning the objective of FIG. 3 are as follows.

Table 3 (FIG. 3)

| Lenses | Radii of curvature | Thicknesses of lenses and distances between them | $n_d$ | $\mu$ |
|---|---|---|---|---|
| $L_{16}$ | $r_{16f}=87.105$ | $e_{16}=5.12$ | 1.69112 | 54.0 |
|  | $r_{16r}=37.25$ | $d_{16}=15.37$ | air |  |
| $L_{17}$ | $r_{17f}=\infty$ | $e_{17}=2.56$ | 1.80 | 45 |
|  | rear face section parabola (parameter=15) | $d_{17}=37.75$ | air |  |
| $L_{18}$ | $r_{18f}=93.826$ | $e_{18}=10.25$ | 1.68102 | 32.0 |
|  | $r_{18r}=-42.5$ | $d_{18}=31.33$ | air |  |
| $L_{19}$ | $r_{19f}=7.936$ | $e_{19}=1.79$ | 1.69112 | 54.0 |
|  | $r_{19r}=-179.13$ | $d_{19}=1.82$ | air |  |
| $L_{20}$ | $r_{20f}=-6.852$ | $e_{20}=0.61$ | 1.73259 | 28.4 |
|  | $r_{20r}=9.969$ | $d_{20}=1.38$ | air |  |
| $L_{21}$ | $r_{21f}=-44.039$ | $e_{21}=1.43$ | 1.62023 | 60.2 |
|  | $r_{21r}=-5.7$ | $d_{21}=0.02$ | air |  |
| $L_{22}$ | $r_{22f}=22.888$ | $e_{22}=1.02$ | 1.62023 | 60.2 |
|  | $r_{22r}=-22.888$ |  |  |  |

The focal length of the first system (lenses $L_{16}$ and $L_{17}$) is —7.710. The focal length of the second system (lens $L_{18}$) is 44.36. The focal length of the third system (lenses $L_{19}$, $L_{20}$, $L_{21}$ and $L_{22}$) is 12.017. The focal length of the whole objective is 1.98. The distance between the image plane and the surface of the objective that is closest thereto is 9.28. The aperture is $f/1.9$ and the total object field is 197° (substantially greater than 180°).

The diaphragm $D_3$ is located ahead of the third system, at a distance from the front face of lens $L_{19}$ equal to 1.8.

It is pointed out that with the objective of FIG. 3 the image of an object of constant angular dimension increases when said object moves away from the axis of the objective.

The present application is a continuation in part of my application Ser. No. 761,971, filed September 19, 1958, now abandoned.

What I claim is:

1. A photographic objective which comprises, in combination, three distinct dioptric systems disposed behind one another, the first of said systems having a negative focal length and one of its surfaces having the shape of a paraboloid of revolution the concavity of which is turned in the direction in which light is travelling, the second of said systems having a positive focal length, and the third of said systems having a positive focal length, and a diaphragm, the absolute value of the focal length of the first dioptric system being more than $2f$ and less than $4.5f$, where $f$ is the focal length of the whole objective, the focal length of the second dioptric system being more than $8f$ and less than $25f$, the focal length of the third dioptric system being more than $3f$ and less than $6.5f$, the distance between the rear face of the first system and the front face of the second system being more than $5f$ and less than $20f$, the distance between the rear face of the second system and the front face of the third system being more than $4f$ and less than $16f$, said diaphragm being located between two planes, one located at a distance $f$ ahead of the front face of the third system and the other at a distance $f$ behind the rear face of the third system.

2. An objective according to claim 1 in which the focal length of the second dioptric system has a value ranging from two to six times the absolute value of the focal length of the first dioptric system.

3. An objective according to claim 1 in which the first dioptric system consists of a single plano-parabolic lens.

4. An objective according to claim 1 in which the first dioptric system consists of two lenses, the front one being a spherical meniscus and the second one a plano-parabolic lens.

References Cited in the file of this patent

FOREIGN PATENTS

| | | |
|---|---|---|
| 384,879 | Germany | Nov. 9, 1923 |
| 620,538 | Germany | Oct. 23, 1935 |